United States Patent
Kumar et al.

(10) Patent No.: US 10,033,843 B2
(45) Date of Patent: *Jul. 24, 2018

(54) NETWORK DEVICE AND METHOD FOR PROCESSING A SESSION USING A PACKET SIGNATURE

(71) Applicant: 128 Technology, Inc., Burlington, MA (US)

(72) Inventors: Prashant Kumar, Andover, MA (US); Patrick Timmons, Newton, MA (US); Patrick J. MeLampy, Dunstable, MA (US)

(73) Assignee: 128 Technology, Inc., Burlington, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/670,270

(22) Filed: Aug. 7, 2017

(65) Prior Publication Data

US 2017/0359450 A1    Dec. 14, 2017

Related U.S. Application Data

(63) Continuation of application No. 14/715,036, filed on May 18, 2015, now Pat. No. 9,729,682.

(51) Int. Cl.
*H04L 9/00*       (2006.01)
*H04L 29/08*      (2006.01)
*H04L 29/06*      (2006.01)

(52) U.S. Cl.
CPC .......... *H04L 69/325* (2013.01); *H04L 63/126* (2013.01); *H04L 67/06* (2013.01);
(Continued)

(58) Field of Classification Search
CPC ............ H04L 63/1416; H04L 63/0823; H04L 63/1408; H04L 63/1441; H04L 63/1458;
(Continued)

(56) References Cited

U.S. PATENT DOCUMENTS 4,975,865 A    12/1990  Carrette et al.
6,243,747 B1    6/2001  Lewis et al.
(Continued)

FOREIGN PATENT DOCUMENTS

CN    101552703 A    10/2009
CN    101646220 A     2/2010
(Continued)

OTHER PUBLICATIONS

Berners-Lee, et al., *Uniform Resource Identifier (URI): Generic Syntax*, Network Working Group, Request for Comments 3986, The Internet Society, 61 pages, Jan. 2005.
(Continued)

*Primary Examiner* — Alexander Lagor
(74) *Attorney, Agent, or Firm* — Sunstein Kann Murphy & Timbers LLP

(57) ABSTRACT

A method processes a session having a first session packet received by a current node in an IP network having a plurality of nodes. The plurality of nodes includes a next node, and the current node that communicates with the next node using a Layer 3 protocol. The method receives the first session packet, which has a digital signature, payload data, and meta-data, at the current node. The method uses the payload data and meta-data to produce validation information, and uses the digital signature to produce a comparator digital signature. Next, the method compares the validation information with the comparator digital signature. If the validation information does not match the comparator digital signature, then the method discards the first session packet. If there is a match, then the method digitally signs the first session packet, and routes the first session packet to the next node via the IP network.

31 Claims, 6 Drawing Sheets

(52) U.S. Cl.
CPC .............. *H04L 67/14* (2013.01); *H04L 67/42* (2013.01); *H04L 69/22* (2013.01)

(58) Field of Classification Search
CPC ... H04L 63/20; H04L 63/145; H04L 63/0263; H04L 63/0227; H04L 69/16
See application file for complete search history.

(56) References Cited

U.S. PATENT DOCUMENTS

| | | | |
|---|---|---|---|
| 6,515,963 | B1 | 2/2003 | Bechtolsheim et al. |
| 6,563,824 | B1 | 5/2003 | Bhatia et al. |
| 6,584,071 | B1 | 6/2003 | Kodialam et al. |
| 6,687,220 | B1 | 2/2004 | Ayres |
| 6,721,334 | B1 | 4/2004 | Ketcham |
| 6,738,387 | B1 | 5/2004 | Lin et al. |
| 6,778,531 | B1 | 8/2004 | Kodialam et al. |
| 6,798,743 | B1 | 9/2004 | Ma et al. |
| 7,020,143 | B2 | 3/2006 | Zdan |
| 7,035,214 | B1 | 4/2006 | Seddigh et al. |
| 7,106,739 | B2 | 9/2006 | Beier |
| 7,150,037 | B2 | 12/2006 | Wolf et al. |
| 7,154,902 | B1 | 12/2006 | Sikdar |
| 7,218,632 | B1 | 5/2007 | Bechtolsheim et al. |
| 7,315,541 | B1 | 1/2008 | Housel et al. |
| 7,373,660 | B1 | 5/2008 | Guichard et al. |
| 7,466,703 | B1 | 12/2008 | Arunachalam et al. |
| 7,536,720 | B2 | 5/2009 | Burdett et al. |
| 7,558,847 | B2 | 7/2009 | Strassner |
| 7,634,805 | B2 | 12/2009 | Aroya |
| 7,706,411 | B2 | 4/2010 | Wakumoto et al. |
| 7,730,301 | B2 | 6/2010 | Correll et al. |
| 7,773,611 | B2 | 8/2010 | Booth, III et al. |
| 7,872,973 | B2 | 1/2011 | Sterne et al. |
| 8,068,417 | B1 | 11/2011 | Roberts |
| 8,094,560 | B2 | 1/2012 | Bagepalli et al. |
| 8,139,479 | B1 | 3/2012 | Raszuk |
| RE44,119 | E | 4/2013 | Wang et al. |
| 8,437,248 | B2 | 5/2013 | Li et al. |
| 8,527,641 | B2 | 9/2013 | Degaonkar et al. |
| 8,570,893 | B2 | 10/2013 | Guo et al. |
| 8,584,199 | B1 | 11/2013 | Chen et al. |
| 8,634,428 | B2 | 1/2014 | Le Pennec et al. |
| 8,804,489 | B2 | 8/2014 | Lu et al. |
| 8,832,241 | B2 | 9/2014 | Mithyantha |
| 8,942,085 | B1 | 1/2015 | Pani et al. |
| 8,989,020 | B2 | 3/2015 | So |
| 9,059,920 | B2 | 6/2015 | Ravindran et al. |
| 9,160,652 | B2 | 10/2015 | Taillon et al. |
| 9,240,953 | B2 | 1/2016 | Carlstrom |
| 9,276,864 | B1 | 3/2016 | Vincent |
| 9,729,439 | B2 | 8/2017 | MeLampy et al. |
| 9,729,682 | B2 | 8/2017 | Kumar et al. |
| 9,736,184 | B2 | 8/2017 | Kumar et al. |
| 2001/0030649 | A1 | 10/2001 | Mamiya et al. |
| 2002/0044553 | A1 | 4/2002 | Chakravorty |
| 2002/0075883 | A1 | 6/2002 | Dell et al. |
| 2002/0150041 | A1 | 10/2002 | Reinshmidt et al. |
| 2002/0176363 | A1 | 11/2002 | Durinovic-Johri et al. |
| 2003/0081624 | A1 | 5/2003 | Aggarwal et al. |
| 2003/0191857 | A1 | 10/2003 | Terrell et al. |
| 2003/0198189 | A1 | 10/2003 | Roberts et al. |
| 2003/0214938 | A1 | 11/2003 | Jindal et al. |
| 2004/0014467 | A1 | 1/2004 | O'Neill et al. |
| 2004/0088542 | A1 | 5/2004 | Daude et al. |
| 2004/0264481 | A1 | 12/2004 | Darling et al. |
| 2005/0013300 | A1 | 1/2005 | Akahane et al. |
| 2005/0018618 | A1 | 1/2005 | Mualem et al. |
| 2005/0036616 | A1 | 2/2005 | Huang et al. |
| 2005/0063307 | A1 | 3/2005 | Samuels et al. |
| 2005/0182932 | A1 | 8/2005 | Wheeler |
| 2005/0213570 | A1 | 9/2005 | Stacy et al. |
| 2005/0238022 | A1 | 10/2005 | Panigrahy |
| 2005/0249206 | A1 | 11/2005 | Wybenga et al. |
| 2006/0045014 | A1 | 3/2006 | Charzinski |
| 2006/0176894 | A1 | 8/2006 | Oh et al. |
| 2007/0171825 | A1 | 7/2007 | Roberts et al. |
| 2007/0171826 | A1 | 7/2007 | Roberts et al. |
| 2008/0214175 | A1 | 9/2008 | Papadoglou et al. |
| 2008/0259938 | A1 | 10/2008 | Keene et al. |
| 2009/0007021 | A1 | 1/2009 | Hayton |
| 2009/0059958 | A1 | 3/2009 | Nakata |
| 2009/0086651 | A1 | 4/2009 | Luft et al. |
| 2010/0125898 | A1 | 5/2010 | Dubuc et al. |
| 2010/0191968 | A1 | 7/2010 | Patil et al. |
| 2011/0299554 | A1 | 12/2011 | Ros-Giralt et al. |
| 2012/0144061 | A1 | 6/2012 | Song |
| 2012/0236860 | A1 | 9/2012 | Kompella et al. |
| 2013/0227166 | A1 | 8/2013 | Ravindran et al. |
| 2013/0297824 | A1 | 11/2013 | Lan et al. |
| 2014/0040488 | A1 | 2/2014 | Small et al. |
| 2014/0115688 | A1 | 4/2014 | Zuk et al. |
| 2014/0177639 | A1 | 6/2014 | Vershikov et al. |
| 2015/0188814 | A1 | 7/2015 | Jain et al. |
| 2015/0229618 | A1 | 8/2015 | Wan et al. |
| 2015/0381324 | A1 | 12/2015 | Mirsky et al. |
| 2016/0094444 | A1 | 3/2016 | MeLampy et al. |
| 2016/0164780 | A1 | 6/2016 | Timmons et al. |

FOREIGN PATENT DOCUMENTS

| | | |
|---|---|---|
| CN | 101068242 B | 4/2010 |
| CN | 102158371 A | 8/2011 |
| CN | 101640629 B | 8/2012 |
| CN | 102739507 A | 10/2012 |
| CN | 101207604 B | 3/2013 |
| CN | 102769679 B | 6/2015 |
| CN | 103179192 B | 11/2015 |
| CN | 105245469 A | 1/2016 |
| EP | 0 765 522 B1 | 5/2004 |
| EP | 1 313 267 B1 | 12/2006 |
| EP | 2 541 848 A1 | 1/2013 |
| KR | 10-2011-0062994 A | 6/2011 |
| WO | WO 2007/084707 A2 | 7/2007 |
| WO | WO 2007/084755 A2 | 7/2007 |
| WO | WO 2008/043230 A1 | 4/2008 |
| WO | WO 2015/131537 A1 | 9/2015 |
| WO | WO 2016/007052 A1 | 1/2016 |

OTHER PUBLICATIONS

Bjorklund, *YANG—A Data Modeling Language for the Network Configuration Protocol (NETCONF)*, Internet Engineering Task Force (IETF), Request for Comments 6020, ISSN: 2070-1721, 173 pages, Oct. 2010.

Caida, *Observing routing asymmetry in Internet traffic*, (www.caida.org/research/traffic-analysis/asymmetry/1), 7 pages, dated Jul. 17, 2013.

Chiosi, et al., *Network Functions Virtualisation—Introductory White Paper*, Issue 1, at the "SDN and OpenFlow World Congress," Darmstadt-Germany, (http://portal.etsi.org/nfv/nfv_white_paper), 16 pages, dated Oct. 22, 2012.

Cisco Systems, *Parallel E xpress Forwarding on the Cisco 10000 Series*, (White Paper) Cisco Systems, printed Jun. 17, 2015, 4 pages.

Data Plane Development Kit, *Programmer's Guide, Release 16.04.0*, 216 pages, Apr. 12, 2016.

Davis, *Layer 3 Switches Explained*, Happy Router, 6 pages, dated Aug. 30, 2007.

Filsfils, et al., *Segment Routing Architecture*, Network Working Grroup, Draft, 28 pages, Oct. 21, 2013.

Hansson, et al., *A Unified Approach to Constrained Mapping and Routing on Network-on-Chip Architectures*, CODES+ISSS '05 Proceedings of the 3rd IEEE/ACM/IFIP International Conference on Hardware/Software Codesign and System Synthesis, 6 pages, Sep. 19-21, 2005.

Herbert, *xps: Transmit Packet Steering*, Eklektix, Inc., Oct. 26, 2010, 11 pages.

Iana, *Transmission Control Protocol (TCP) Parameters*, www.iana.org/assignments/tcp-parameters/tcp-parameters.xhtm), 5 pages, dated Sep. 22, 2014.

(56) References Cited

OTHER PUBLICATIONS

Iyer, *Load Balancing and Parallelism for the Internet*, A Dissertation submitted to the Dept. of Computer Science and the Committee on Graduate Studies of Stanford University in Partial Fulfillment of the Requirements for the Degree of Doctor of Philosophy, retrieved on the internet at http://yuba.stanford.edu/~sundaes/Dissertation/sundar_thesis.pdf, 436 pages, Jul. 2008.
Jamjoom, et al., *Persistent Dropping: An Efficient Control of Traffic Aggregates*, https://cs.uwaterloo.ca/~brecht/servers/readings-new/jamjoon-sigcomm-2003.pdf, SIGCOMM'03, 12 pages, 2003.
Katz, et al., *Bidirectional Forwarding Detection (BED)*, Internet Engineering Task Force (IETF), Request for Comments 5880, ISSN: 2070-1721, Juniper Networks, 49 pages, Jun. 2010.
Klement, *1.2 Overview of a TCP communications session*, RPG IV Socket Tutorial (http://www.scottklement.com/rpg/socketut/overview), 2 pages, 2001.
Kumar, et al., Comparison of Queuing Algorithms against DDoS Attack, https://pdfs.semanticscholar.org/d3d6/15bf0094e7564a57267c34683aa5e590e4ed.pdf, International Journal of Computer Science and Information Technologies, vol. 2 (4), pp. 1574-1580, 2011.
Microsoft, *Introduction to Receive Side Scaling*, Developer Resources, https://msdn.microsoft.com/en-us/library/windows/hardware/ff556942(v=vs.85).aspx, 3 pages, Apr. 2014.
Microsoft, *RSS with a Single Hardware Receive Queue*, Developer Resources, https://msdn.microsoft.com/en-us/library/windows/hardware/ff570727(v=vs.85).aspx, 2 pages, Jan. 2015.
Microsoft, *RSS with Hardware Queuing*, Developer Resources, https://msdn.microsoft.com/en-us/library/windows/hardware/ff570728(v=vs.85).aspx, 2 pages, Jan. 2015.
Microsoft, *Non-RSS Receive Processing*, Developer Resources, https://msdn.microsoft.com/en-us/library/windows/hardware/ff568798(v=vs.85).aspx, 2 pages, Jan. 2015.
PC Magazine Encyclopedia, *Definition of TCP/IP abc's*, PC Magazine Encyclopedia (www.pcmag.com/encyclopedia/term/52615), 5 pages, 2005.
Pervidi, et al., *IPv6 Segment Routing Header (SRH)*, Network working Group, Draft, 24 pages, Jul. 3, 2014.
Roberts, *The Next Generation of IP—Flow Routing*, SSGRR 2003S International Conference, L'Aquila Italy, 11 pages, Jul. 29, 2003.
Rouse, *What is routing table?*, Posted by Margaret Rouse (http://searchnetworking.techtarget.com/definition/routing-table), 5 pages, Apr. 2007.
Shang, et al., *Making Better Use of All Those TCP ACK Packets*, Computer Science Department, Worcester Polytechnic Institute, 10 pages, 2005.
Shaw, *Multi-queue network interfaces with SMP on Linux*, Greenhost, https://greenhost.net/2013/04/10/multi-queue-network-interfaces-with-smp-on-linux/, 5 pages, Apr. 10, 2013.
Sollins, et al., *Functional Requirements for Uniform Resource Names*, Network Working Group, Request for Comments 1737, 7 pages, Dec. 1994.
Srinivasan, et al., *A Technique for Low Energy Mapping and Routing in Network-on-Chip Architectures*, ISLPED '05 Proceedings of the 2005 International Symposium on Low Power Electronics and Design, 6 pages, Aug. 8-10, 2005.
Wikipedia, *LAN switching*, 5 pages, dated Jun. 12, 2013.
Wikipedia, *Management information base*, 6 pages, dated Jul. 15, 2013.
Wikipedia, *Reverse path forwarding*, 3 pages, dated Jul. 31, 2013.
Wikipedia, *Equal-cost multi-path routing*, 1 page, dated Sep. 12, 2013.
Wikipedia, *Transmission Control Protocol*, 18 pages, dated Sep. 16, 2013.
Wikipedia, *Software-defined networking*, 6 pages, dated Sep. 16, 2013.
Wikipedia, *Network socket*, 4 pages, dated Sep. 19, 2013.
Wikipedia, *Router (computing)*, 8 pages, dated Sep. 23, 2013.
Wikipedia, *Network address translation*, 11 pages, dated Sep. 24, 2013.
Wikipedia, *Open vSwitch*, 2 pages, dated Nov. 24, 2013.
Wikipedia, *Active queue management*, https://en.wikipedia.org/wiki/Active_queue_management, 2 pages, Apr. 22, 2015.
Wikipedia, *Network interface controller*, https://en.wikipedia.org/wiki/Network_interface_controller,5 pages, May 19, 2015.
International Searching Authority, International Search Report—International Application No. PCT/2015/044815, dated Dec. 6, 2015, together with the Written Opinion of the International Searching Authority, 8 pages.
International Searching Authority, International Search Report—International Application No. PCT/2015/060840, dated Mar. 8, 2016, together with the Written Opinion of the International Searching Authority, 13 pages.
International Searching Authority, International Search Report—International Application No. PCT/US2016/013416, dated Jun. 8, 2016, together with the Written Opinion of the International Searching Authority, 12 pages.
International Searching Authority, International Search Report—International Application No. PCT/US2016/026938, dated Jul. 28, 2016, together with the Written Opinion of the International Searching Authority, 9 pages.
International Searching Authority, International Search Report—International Application No. PCT/US2016/062033, dated Mar. 7, 2017, together with the Written Opinion of the International Searching Authority, 10 pages.
International Searching Authority, International Search Report—Application No. PCT/US2017/016984, dated May 18, 2017, together with the Written Opinion of the International Searching Authority, 10 pages.
International Searching Authority, International Search Report—Application No. PCT/US2017/032907, dated Aug. 3, 2017, together with the Written Opinion of the International Searching Authority, 8 pages.
Israel Patent Office, International Search Report, International Application No. PCT/US2017/027169, together with the Written Opinion of the International Searching Authority, 13 pages, dated Jul. 13, 2017.
Israel Patent Office, International Search Report, International Application No. PCT/US2017/027166, together with the Written Opinion of the International Searching Authority, dated Jul. 18, 2017, 8 pages.
International Searching Authority, International Search Report—International Application No. PCT/US2017/029399, dated Aug. 14, 2017, together with the Written Opinion of the International Searching Authority, 9 pages.
International Searching Authority, International Search Report—International Application No. PCT/US2017/030184, dated Aug. 6, 2017, together with the Written Opinion of the International Searching Authority, 10 pages.

NETWORK DEVICE AND METHOD FOR PROCESSING A SESSION USING A PACKET SIGNATURE

RELATED APPLICATIONS

This patent application is a continuation of U.S. patent application Ser. No. 14/715,036, filed May 18, 2015, entitled "NETWORK DEVICE AND METHOD FOR PROCESSING A SESSION USING A PACKET SIGNATURE" (now U.S. Pat. No. 9,729,682, issued Aug. 8, 2017), the contents of which are hereby incorporated herein, in its entirety, by reference, for all purposes.

This patent application is related to U.S. patent application Ser. No. 14/497,954, filed Sep. 26, 2014, entitled, "NETWORK PACKET FLOW CONTROLLER," (now U.S. Pat. No. 9,729,438, issued Aug. 8, 2017), the disclosure of which is incorporated herein, in its entirety, by reference.

This patent application also is related to U.S. patent application Ser. No. 14/562,917, filed Dec. 8, 2014, entitled, "STATEFUL LOAD BALANCING IN A STATELESS NETWORK," the disclosure of which is incorporated herein, in its entirety, by reference.

FIELD OF THE INVENTION

The invention generally relates to network devices and, more particularly, the invention relates to security for network routing devices

BACKGROUND OF THE INVENTION

The Internet Protocol ("IP") serves as the de-facto standard for forwarding data messages ("datagrams") between network devices connected with the Internet. To that end, IP delivers datagrams across a series of Internet devices, such as routers and switches, in the form of one or more data packets. Each packet has two principal parts: (1) a payload with the information being conveyed (e.g., text, graphic, audio, or video data), and (2) a header, known as an "IP header," having the address of the network device to receive the packet(s) (the "destination device"), the identity of the network device that sent the packet (the "originating device"), and other data for routing the packet. Many people thus analogize packets to a traditional letter using first class mail, where the letter functions as the payload, and the envelope, with its return and mailing addresses, functions as the IP header.

When routing packets across a public or private network, there often is a risk that a person or device in that network may attempt to access and/or modify those packets. This problem has been variously described as the "man-in-the-middle" problem.

SUMMARY OF VARIOUS EMBODIMENTS

In accordance with illustrative embodiments of the invention, a method processes a session having a first session packet received by a current node in an IP network having a plurality of nodes. The plurality of nodes also includes a next node, and the current node is configured to communicate with the next node using a Layer 3 protocol. The method receives the first session packet at the current node. The first session packet has a digital signature, payload data, and meta-data. The method processes the payload data and the meta-data to produce validation information, and processes the digital signature using a given authentication key to produce a processed digital signature. Next, the method compares the validation information with the processed digital signature, and takes appropriate action based on the comparison. Specifically, the method discards the first session packet if the validation information does not match the processed digital signature, but digitally signs the first session packet if the validation information matches the processed digital signature. Furthermore, the method routes the first session packet, after/if digitally signing, to the next node via the IP network.

The current node can have the given authentication key, and/or the next node may have a next authentication key. The method thus may digitally sign the first session packet using the next authentication key, the payload and the meta-data. Various embodiments apply to a number of types of sessions, such as a session having the first session packet, a plurality of intermediate session packets, and a last session packet. In that case, the method may digitally sign and forward the first session packet only, or the first session packet and one or more of the intermediate session packets and the last session packet (i.e., performing the above acts to validate the relevant packets before signing).

Among other ways, the validation information may be considered a match the processed digital signature when the validation information is substantially exactly the same as the processed digital signature.

The network also may take on a number of topologies. For example, the network may include a public network having a source node and a destination node. In that case, the first session packet may be received from the source node via a set of nodes and have the destination node address as its ultimate destination. In fact, the current node may include a routing device.

Among other ways, the payload and meta-data may be processed using a one-way hash function. Moreover, the meta-data can include data relating to 1) the session, 2) the payload data, or 3) both the session and payload data, and the first session packet may include a SYN packet of the TCP protocol.

To retrieve the necessary keys, some embodiments start-up the current node, and then retrieve a next authentication key, for the next node, from a key network device across the network. The key network device has a copy of the authentication keys for a set of the plurality of nodes. Further, the given authentication key may be the authentication key for the current node. In that case, the method may digitally sign the first packet using the next authentication key if, of course, the authentication data matches both the payload data and meta-data.

In accordance with another embodiments of the invention, a network routing device processes a session of an IP network having a plurality of nodes. The plurality of nodes includes a next node having a next authentication key, while the network routing device has a current authentication key. The device has, among other things, a signature module operatively coupled with an input interface configured to receive a first session packet with a digital signature, payload data, and meta-data. The signature module is configured for a plurality of functions. Specifically, the signature module is configured to 1) process the digital signature using the current authentication key to produce a processed digital signature, 2) process the payload data and the meta-data to produce validation information, 3) compare the processed digital signature with the validation information to determine if they match, and 4) discard the first session packet there is not a match, or digitally sign the first session packet using the next authentication key if there is a match. The device also has an output interface, operatively coupled with the signature module, to route the first session packet, after digitally signing, to the next node via the IP network using a Layer 3 protocol.

In accordance with other embodiments, a method processes a session having a first session packet received by a current node in an IP network having a plurality of nodes. The plurality of nodes includes a next node, and the current node is configured to communicate with the next node using a Layer 3 protocol. The method receives the first session packet at the current node. This received first session packet has a digital signature, payload data, and meta-data. The method also uses the payload data and the meta-data to produce validation information, and uses the digital signature to produce a comparator digital signature. Next, the method compares the validation information with the comparator digital signature. If the validation information does not match the comparator digital signature, then the method discards the first session packet. If there is a match, however, then the method digitally signs the first session packet, and routes the first session packet, after digitally signing, to the next node via the IP network.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE
EMBODIMENTS

In illustrative embodiments, a Layer 3 routing device/node more securely routes packets of a session between a source and a destination. To that end, after authenticating a packet in the session, the node digitally signs and routes that packet using a Layer 3 protocol (e.g., TCP or UDP). Among other things, this packet may include both payload, and metadata relating to the session and/or the payload. In that case, the node preferably uses both the payload and the metadata to generate the digital signature. Accordingly, during its transfer between the source and destination, this packet should be less susceptible to intervening tampering by the so-called "man-in-the-middle." Details of various embodiments are discussed below.

Networks

Illustrative embodiments preferably are implemented on a conventional computer network. Among other things, a network includes at least two nodes and at least one link between the nodes. Nodes can include computing devices (sometimes referred to as hosts or devices) and routers. Computers may include personal computers, smart phones, television "cable boxes," automatic teller machines (ATMs) and many other types of equipment that include processors and network interfaces. Links include wired and wireless connections between pairs of nodes. In addition, nodes and/or links may be implemented completely in software, such as in a virtual machine, a software defined network, and using network function virtualization. Many networks include switches, which are largely transparent for purposes of this discussion. However, some switches also perform routing functions. For the present discussion, such routing switches are considered routers. Routers are described below.

Figure 1:
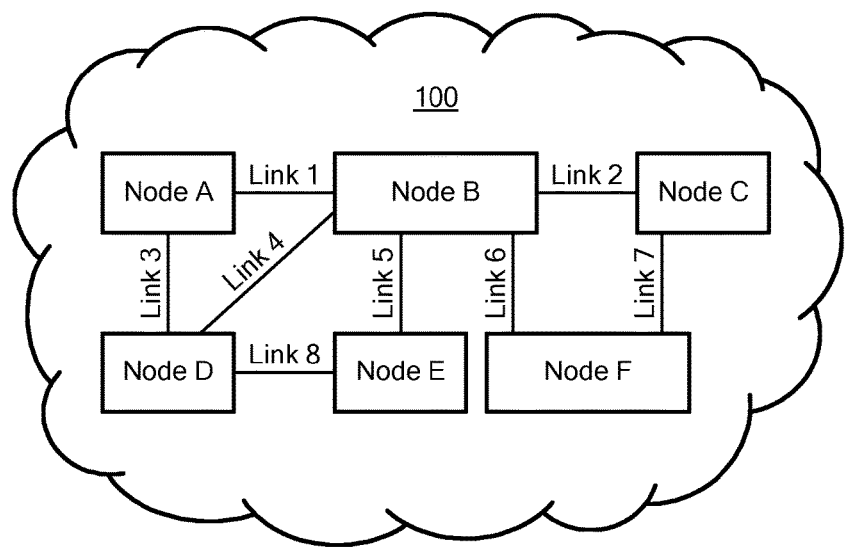
FIG. 1 schematically shows a hypothetical prior art network that may use illustrative embodiments of the invention.

A node can be directly connected to one or more other nodes, each via a distinct link. For example, FIG. 1 schematically shows a Node A directly connected to Node B via Link 1. In a given network (e.g., within a local area network), each node has a unique network address to facilitate sending and receiving data. A network includes all the nodes addressable within the network according to the network's addressing scheme, and all the links that interconnect the nodes for communication according to the network's addressing scheme. For example, in FIG. 1, Node A, Node B, Node C . . . Node F and all the links 1-8 together make up a network 100. For simplicity, a network may be depicted as a cloud or as being enclosed within a cloud. Absence of a cloud, however, does not mean a collection of nodes and links are not a network. For example, a network may be formed by a plurality of smaller networks.

Nodes can initiate communications with other nodes via the network, and nodes can receive communications initiated by other nodes via the network. For example, a node may transmit/forward/send data (a message) to a directly connected (adjacent) node by sending the message via the link that interconnects the adjacent nodes. The message includes the network address of the sending node (the "source address") and the network address of the intended receiving node (the "destination address"). A sending node can send a message to a non-adjacent node via one or more other intervening nodes. For example, Node D may send a message to Node F via Node B. Using well known networking protocols, the node(s) between the source and the destination forward the message until the message reaches its destination. Accordingly, to operate properly, network protocols enable nodes to learn or discover network addresses of non-adjacent nodes in their network.

Nodes communicate via networks according to protocols, such as the well-known Internet Protocol (IP) and Transmission Control Protocol (TCP). The protocols are typically implemented by layered software and/or hardware components, such as according to the well-known seven-layer Open System Interconnect (OSI) model. As an example, IP operates at OSI Layer 3 (Network Layer), while the TCP operates largely at OSI Layer 4 (Transport Layer). Each layer performs a logical function and abstracts the layer below it, therefore hiding details of the lower layer.

Figure 2:
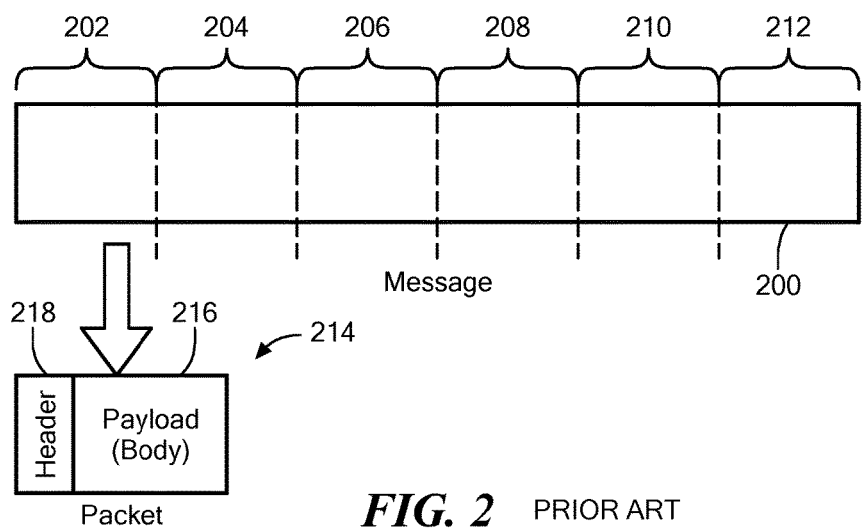
FIG. 2 schematically shows a fragmentation of a prior art message that may be used with illustrative embodiments of the invention.

For example, Layer 3 may fragment a large message into smaller packets if Layer 2 (Data Link Layer) cannot handle the message as one transmission. FIG. 2 schematically illustrates a large message 200 divided into several pieces 202, 204, 206, 208, 210 and 212. Each piece 202-212 may then be sent in a separate packet, exemplified by packet 214. Each packet includes a payload (body) portion, exemplified by payload 216, and a header portion, exemplified at 218. The header portion 218 contains information, such as the packet's source address, destination address and packet sequence number, necessary or desirable for: 1) routing the packet to its destination, 2) reassembling the packets of a message, and 3) other functions provided according to the protocol. In some cases, a trailer portion is also appended to the payload, such as to carry a checksum of the payload or of the entire packet. All packets of a message need not be sent along the same path, i.e., through the same nodes, on their way to their common destination. It should be noted that although IP packets are officially called IP datagrams, they are commonly referred to simply as packets.

Some other protocols also fragment data into packets. For example, the TCP fragments data into segments, officially referred to as TCP protocol data units (PDUs). Nevertheless, in common usage, the term packet is used to refer to PDUs and datagrams, as well as Ethernet frames.

Most protocols encapsulate packets of higher level protocols. For example, IP encapsulates a TCP packet by adding an IP header to the TCP packet to produce an IP packet. Thus, packets sent at a lower layer can be thought of as being made up of packets within packets. Conventionally, a component operating according to a protocol examines or modifies only information within a header and/or trailer that was created by another component, typically within another node, operating according to the same protocol. That is, conventionally, components operating according to a protocol do not examine or modify portions of packets created by other protocols.

In another example of abstraction provided by layered protocols, some layers translate addresses. Some layers include layer-specific addressing schemes. For example, each end of a link is connected to a node via a real (e.g., electronic) or virtual interface, such as an Ethernet interface. At Layer 2 (Data Link Layer), each interface has an address, such as a media access control (MAC) address. On the other hand, at Layer 3 using IP, each interface, or at least each node, has an IP address. Layer 3 converts IP addresses to MAC addresses.

Figure 3:
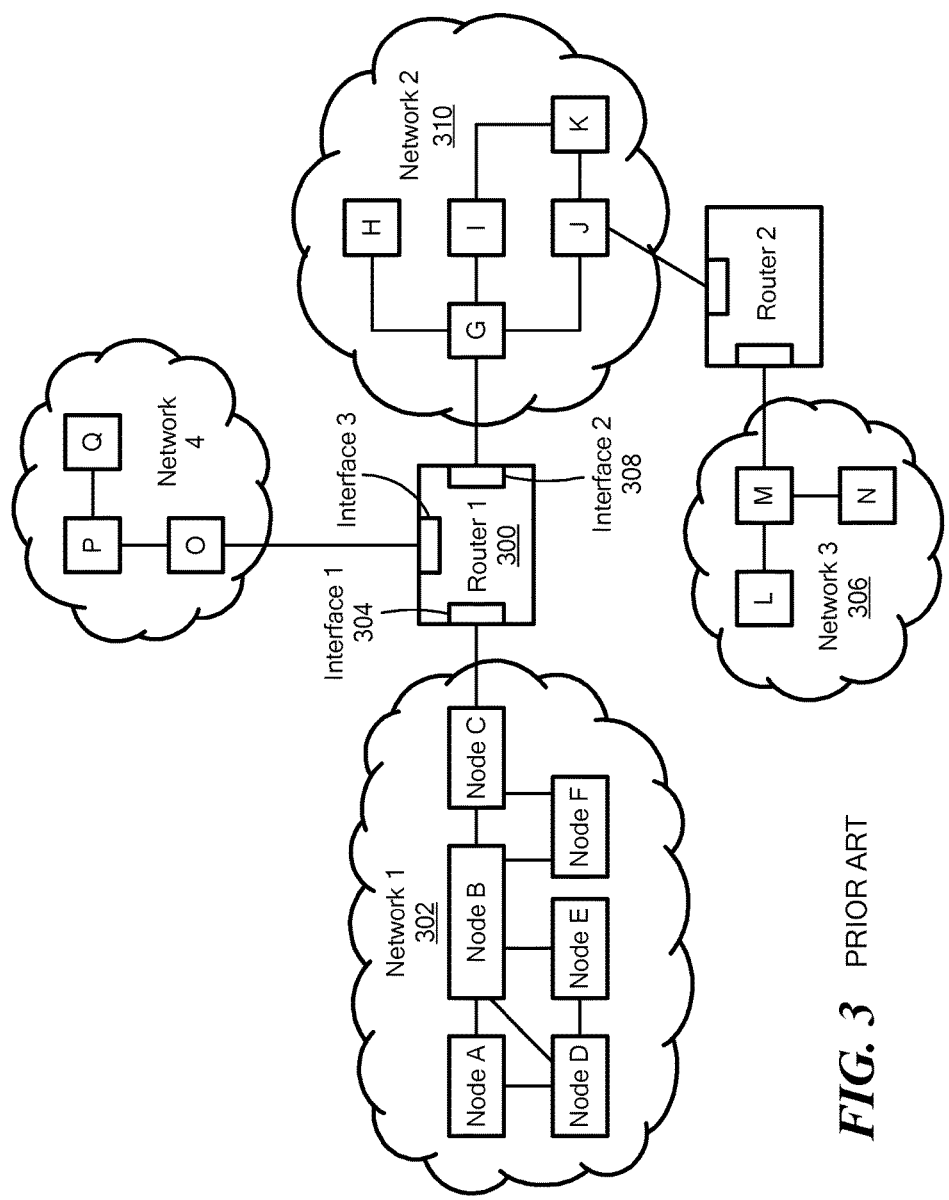
FIG. 3 schematically shows a generic prior art internet that may implement illustrative embodiments of the invention.

A router typically acts as a node that interconnects two or more distinct networks or two or more sub-networks (subnets) of a single network, thereby creating a "network of networks" (i.e., an internet). Thus, a router has at least two interfaces, where each interface connects the router to a different network, as exemplified in FIG. 3. When a router receives a packet via one interface from one network, it uses information stored in its routing table to direct the packet to another network via another interface. The routing table contains network/next hop associations. These associations tell the router that a particular destination can optimally be reached by sending the packet to a specific router that represents a next hop on the way to the final destination. For example, if Router 1 300 receives a packet, via its Interface 1 304, from Network 1 302, and the packet is destined to a node in Network 3 306, the Router 1 300 consults its router table and then forwards the packet via its Interface 2 308 to Network 2 310. Network 2 310 will then forward the packet to Network 3 306. The next hop association can also be indicated in the routing table as an outgoing (exit) interface to the final destination.

Large organizations, such as large corporations, commercial data centers and telecommunications providers, often employ sets of routers in hierarchies to carry internal traffic. For example, one or more gateway routers may interconnect each organization's network to one or more Internet service providers (ISPs). ISPs also employ routers in hierarchies to carry traffic between their customers' gateways, to interconnect with other ISPs, and to interconnect with core routers in the Internet backbone.

A conventional router is considered a Layer 3 device because its primary forwarding decision is based on the information in the Layer 3 IP packet—specifically the destination IP address. A conventional router does not look into the actual data contents (i.e., the encapsulated payload) that the packet carries. Instead, the router only looks at the Layer 3 addresses to make a forwarding decision, plus optionally other information in the header for hints, such as quality of service (QoS) requirements. Once a packet is forwarded, a conventional router does not retain historical information about the packet, although the forwarding action may be collected to generate statistical data if the router is so configured.

Accordingly, an IP network is considered to be "stateless" because, among other things, it does not maintain this historical information. For example, an IP network generally treats each request as an independent transaction that is unrelated to any previous request. A router thus may route a packet regardless of how it processed a prior packet. As such, an IP network typically does not store session information or the status of incoming communications partners. For example, if a part of the network becomes disabled mid-transaction, there is no need to reallocate resources or otherwise fix the state of the network. Instead, packets may be routed along other nodes in the network. Illustrative embodiments, however, may include routers that statefully communicate, such as those described in the above referenced incorporated patent applications.

As noted, when a router receives a packet via one interface from one network, the router uses its routing table to direct the packet to another network. Table 1 lists information typically found in a basic IP routing table.

TABLE 1

| | |
|---|---|
| Destination | Partial IP address (Expressed as a bit-mask) or Complete IP address of a packet's final destination |
| Next hop | IP address to which the packet should be forwarded on its way to the final destination |
| Interface | Outgoing network interface to use to forward the packet |
| Cost/Metric | Cost of this path, relative to costs of other possible paths |
| Routes | Information about subnets, including how to reach subnets that are not directly attached to the router, via one or more hops; default routes to use for certain types of traffic or when information is lacking |

Routing tables may be filled in manually, such as by a system administrator, or dynamically by the router. The router uses routing protocols to exchange information with other routers and, thereby, dynamically learn about surrounding network or internet topology. For example, routers announce their presence in the network(s), more specifically, the range of IP addresses to which the routers can forward packets. Neighboring routers update their routing tables with this information and broadcast their ability to forward packets to the network(s) of the first router. This information eventually spreads to more distant routers in a network. Dynamic routing allows a router to respond to changes in a network or internet, such as increased network congestion, new routers joining an internet, and router or link failures.

A routing table therefore provides a set of rules for routing packets to their respective destinations. When a packet arrives, a router examines the packet's contents, such as its destination address, and finds the best matching rule in the routing table. The rule essentially tells the router which interface to use to forward the packet and the IP address of a node to which the packet is forwarded on its way to its final destination IP address.

With hop-by-hop routing, each routing table lists, for all reachable destinations, the address of the next node along a path to that destination, i.e., the next hop. Assuming that the routing tables are consistent, a simple algorithm of each router relaying packets to their destinations' respective next hop suffices to deliver packets anywhere in a network. Hop-by-hop is a fundamental characteristic of the IP Internetwork Layer and the OSI Network Layer.

Thus, each router's routing table typically merely contains information sufficient to forward a packet to another router that is "closer" to the packet's destination, without a guarantee of the packet ever being delivered to its destination. In a sense, a packet finds its way to its destination by visiting a series of routers and, at each router, using then-current rules to decide which router to visit next, with the hope that at least most packets ultimately reach their destinations.

Note that the rules may change between two successive hops of a packet or between two successive packets of a message, such as if a router becomes congested or a link fails. Two packets of a message may, therefore, follow different paths and even arrive out of order. In other words, when a packet is sent by a source or originating node, as a stateless network, there conventionally is no predetermined path the packet will take between the source node and the packet's destination. Instead, the path typically is dynamically determined as the packet traverses the various routers. This may be referred to as "natural routing," i.e., a path is determined dynamically as the packet traverses the internet.

Although natural routing has performed well for many years, natural routing has shortcomings. For example, because each packet of a session may travel along a different path and traverse a different set of routers, it is difficult to collect metrics for the session. Security functions that may be applicable to packets of the session must be widely distributed or risk not being applied to all the packets. Furthermore, attacks on the session may be mounted from many places.

It should be noted that conventionally, packets sent by the destination node back to the source node may follow different paths than the packets from the source node to the destination node.

In many situations, a client computer node ("client") establishes a session with a server computer node ("server"), and the client and server exchange packets within the session. For example, a client executing a browser may establish a session with a web server using a conventional process. The client may send one or more packets to request a web page, and the web server may respond with one or more packets containing contents of the web page. In some types of sessions, this back-and-forth exchange of packets may continue for several cycles. In some types of sessions, packets may be sent asynchronously between the two nodes. As discussed below, this handshake may be performed to provide a secure session over the Internet using well known protocols such as the Secure Sockets Layer Protocol ("SSL") or the Transport Layer Security Protocol ("TLS").

A session has its conventional meaning; namely, it is a plurality of packets sent by one node to another node, where all the packets are related, according to a protocol. A session may be thought of as including a lead (or initial) packet that begins the session, and one or more subsequent packets of the session. A session has a definite beginning and a definite end. For example, a TCP session is initiated by a SYN packet. In some cases, the end may be defined by a pre-scribed packet or series of packets. For example, a TCP session may be ended with a FIN exchange or an RST. In other cases, the end may be defined by lack of communication between the nodes for at least a predetermined amount of time (a timeout time). For example, a TCP session may be ended after a defined timeout period. Some sessions include only packets sent from one node to the other node. Other sessions include response packets, as in the web client/server interaction example. A session may include any number of cycles of back-and-forth communication, or asynchronous communication, according to the protocol, but all packets of a session are exchanged between the same client/server pair of nodes. A session is also referred to herein as a series of packets.

A computer having a single IP address may provide several services, such as web services, e-mail services and file transfer (FTP) services. Each service is typically assigned a port number in the range 0-65,535 that is unique on the computer. A service is, therefore, defined by a combination of the node's IP address and the service's port number. Note that this combination is unique within the network the computer is connected to, and it is often unique within an internet. Similarly, a single node may execute many clients. Therefore, a client that makes a request to a service is assigned a unique port number on the client's node, so return packets from the service can be uniquely addressed to the client that made the request.

The term socket means an IP address-port number combination. Thus, each service has a network-unique, and often internet-unique, service socket, and a client making a request of a service is assigned a network-unique, and sometimes internet-unique, client socket. In places, the terms source client and destination service are used when referring to a client that sends packets to make requests of a service and the service being requested, respectively.

Network Security and Control

As noted above, problems can arise when routing packets of a session through a public IP network or internet (e.g., across the Internet) For example, using the network of FIG. 1, Node D may transmit a packet to Node C via Node B, Link 4, and Link 2. A person or device along this route, however, can tamper with the packets using conventional technology. For example, Node B could be part of a data center with unscrupulous employees that open and modify the first packet of a TCP session. In addition to potentially compromising confidentiality, such modifications can have other adverse consequences, such as spreading viruses, modifying session parameters, or adversely impacting the session itself.

Figure 4:
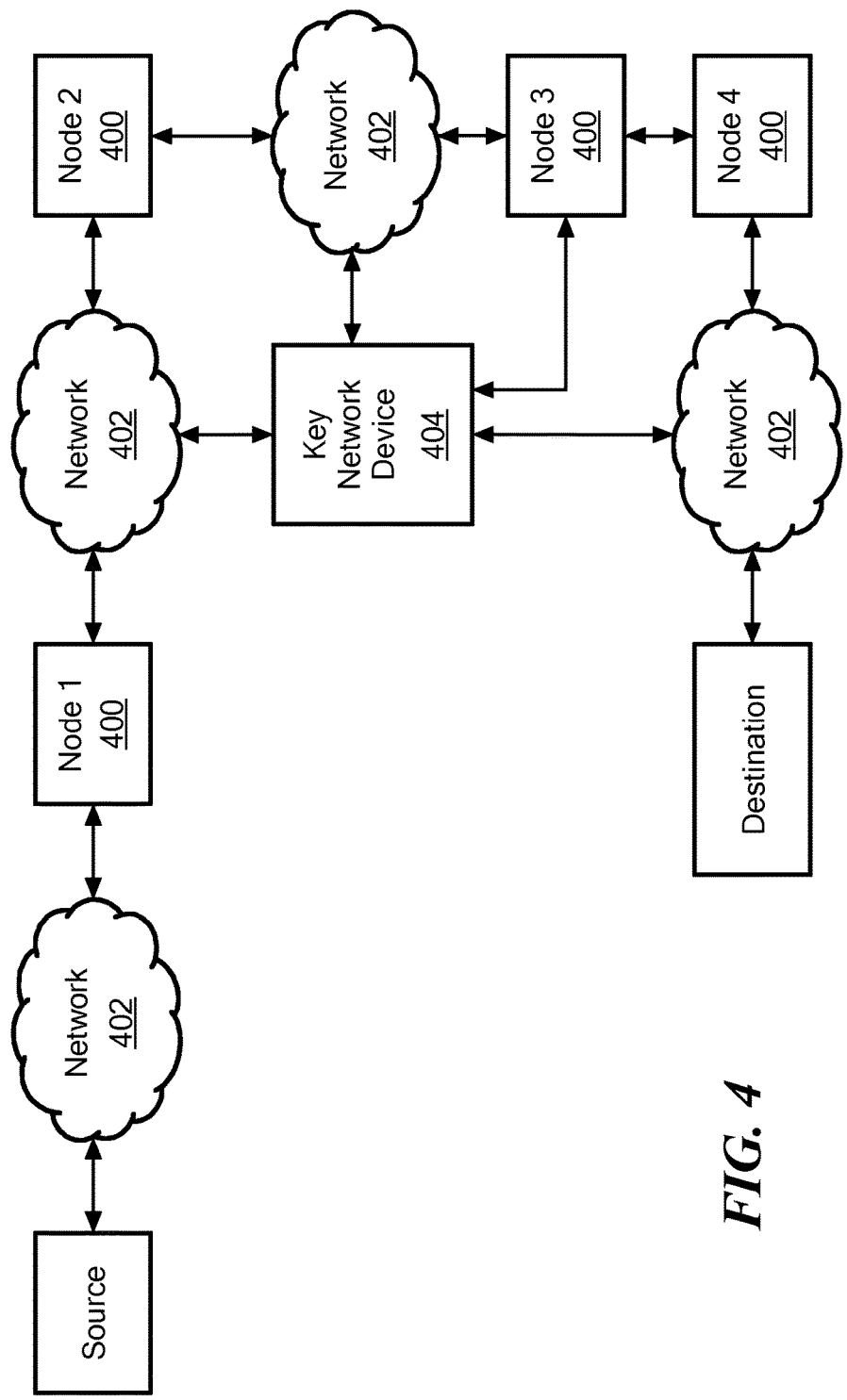
FIG. 4 schematically shows a network that may implement illustrative embodiments of the invention.

Illustrative embodiments install specially configured routing devices/nodes (e.g., routers) in the network to mitigate this problem. FIG. 4 schematically shows another representation of a public network having these specially configured nodes. In this drawing, each specially configured node is generically identified by reference number "400." As shown, the network has a Source (e.g., a "client device," such as a consumer's home personal computer) that communicates with a Destination (e.g., a "server device," such as a web server distributing videos) through plurality of smaller networks 402 and nodes 400. Some of the nodes 400 are connected with the smaller networks 402, or connected to other nodes 400. In fact, although not shown, some of the nodes 400 can be within the smaller networks 402 of FIG. 4. It should be noted that those skilled in the art can use any of a number of other network typologies. Accordingly, in a manner similar to the network of FIG. 1, the network of FIG. 4 is a simplified example used for illustrative purposes and thus, should not limit various embodiments of the invention.

Figure 5:
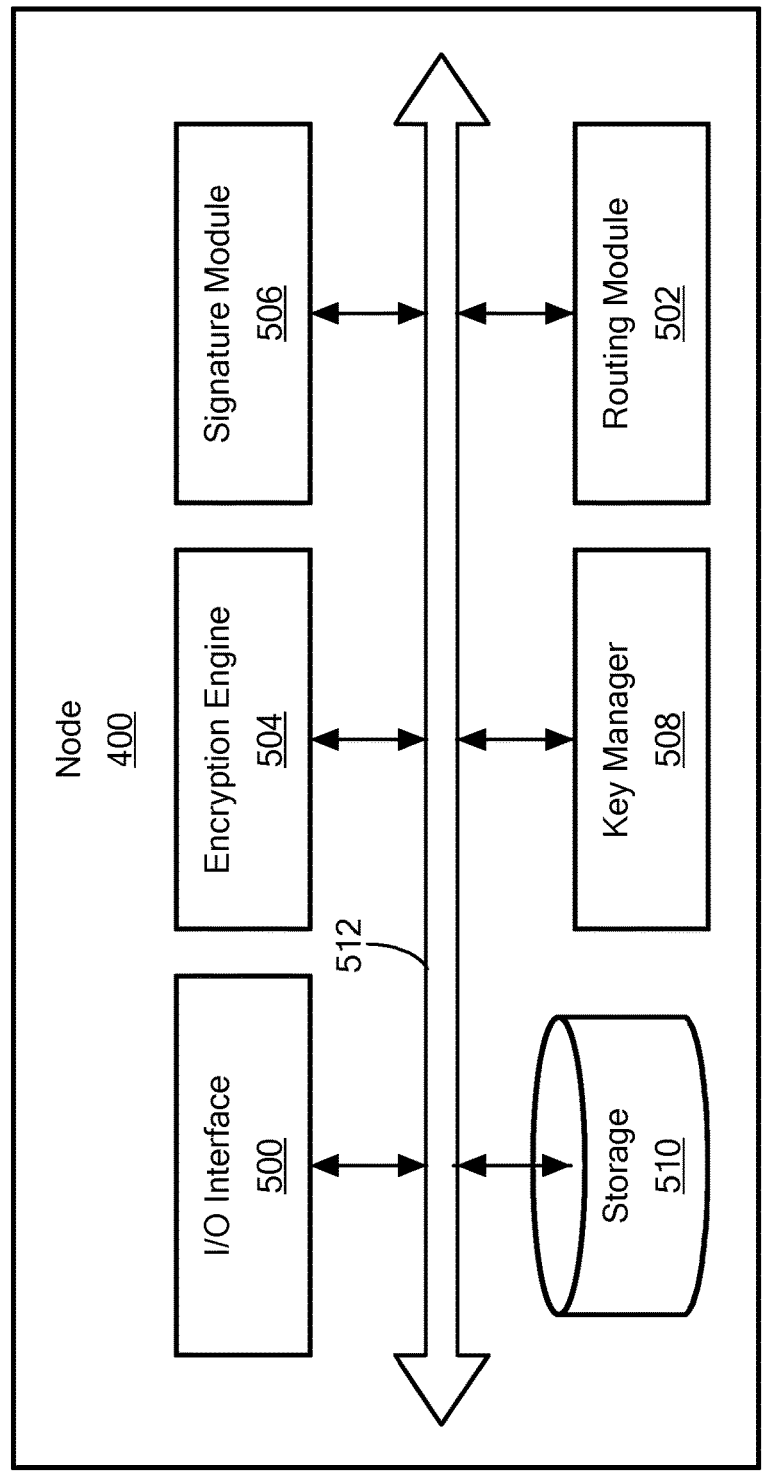
FIG. 5 schematically shows a network device configured to implement illustrative embodiments of the invention.

Each of the specially configured nodes 400 of FIG. 4 derives functionality from a plurality of correspondingly specially configured functional components. To that end, FIG. 5 schematically shows a single node configured in accordance with illustrative embodiments of the invention. In this implementation, the node 400 preferably is a network routing device that processes Layer 3 session packets routed across a network, such as the IP network of FIG. 4.

The network routing device of this embodiment includes an I/O interface 500 for communicating with the network, a routing module 502 that routes packets across the network, and an encryption engine 504 for managing encryption, decryption, and related processes.

The I/O interface 500 can include a single physical interface and attendant software (e.g., driver software), or a plurality of interfaces and their attendant software. For example, in a manner similar to the router 300 of FIG. 3, the I/O interface 500 can include a first interface for communicating with one set of network devices, a second interface for communicating with a second set of network devices, and a third interface for communicating with a third set of network devices. For a given session, one of these interfaces may be considered an input interface while another interface may be considered an output interface. Of course, once skilled in the art can configure the I/O interface 500 in the manner required for the specific network device and the topology of the network to which it is connected.

In addition, the network device also includes a signature module 506 that manages digital signature functions (e.g., generating and validating digital signatures), a key manager 508 that manages encryption and authentication keys used by the node 400, and a data storage device 510 for storing networking and other data, such as private authentication keys. As described in greater detail in the below discussion of FIG. 6, the signature module 506 compares processed signature data with specified data in the packet, and digitally signs the packet in certain circumstances, such as when the packet is positively authenticated.

Each of these components is operatively connected by a conventional interconnect mechanism. As an example, FIG. 5 simply shows a bus 512 communicating each the components. Those skilled in the art should understand, however, that this generalized representation can be modified to include other conventional direct or indirect connections. Accordingly, discussion of a bus 512 is not intended to limit various embodiments.

Indeed, FIG. 5 only schematically shows each of these components. Those skilled in the art should understand that each of these components can be implemented in a variety of conventional manners, such as by using hardware, software, or a combination of hardware and software, across one or more other functional components. For example, the signature module 506 may be implemented using a plurality of microprocessors executing firmware. As another example, the signature module 506 may be implemented using one or more application specific integrated circuits (i.e., "ASICs") and related software, or a combination of ASICs, discrete electronic components (e.g., transistors), and microprocessors. Accordingly, the representation of the signature module 506 and other components in a single box of FIG. 5 is for simplicity purposes only. In fact, some embodiments distribute the network routing device of FIG. 5 across a plurality of different machines—that functionality is not necessarily within a single housing or chassis.

It should be reiterated that the representation of FIG. 5 is a significantly simplified representation of an actual network routing device/node 400. Those skilled in the art should understand that such a device has many other physical and functional components, such as central processing units, other packet processing modules, and various types of memory (e.g., short term memory, additional long term memory, etc.). Accordingly, this discussion is not intended to suggest that FIG. 5 represents all of the elements of a network routing device.

Figure 6:
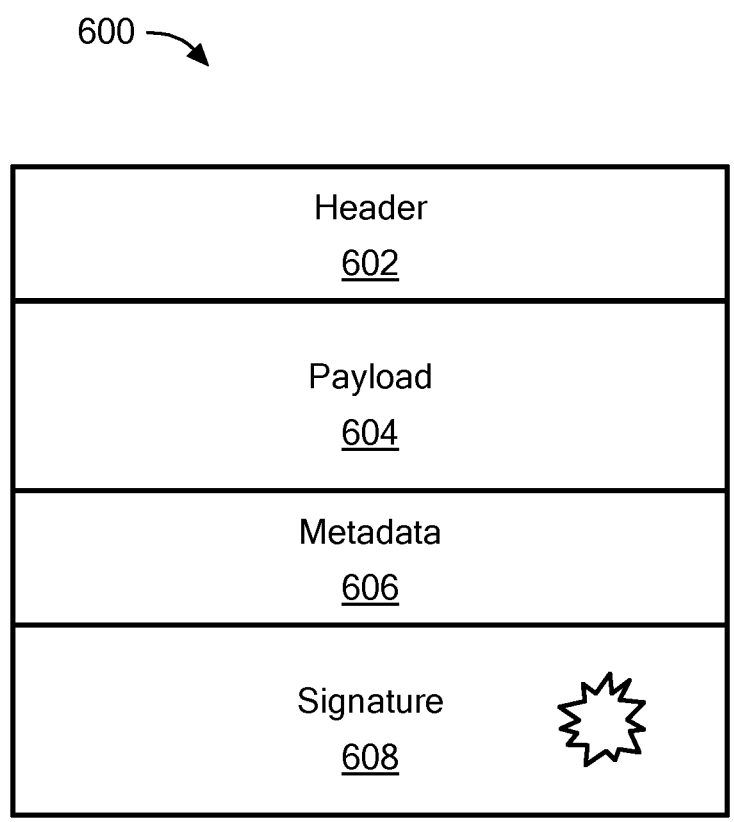
FIG. 6 schematically shows details of a packet that may be configured in accordance with illustrative embodiments of the invention.

As noted above, among other network points, the node 400 of FIG. 5 receives, processes, and transmits packets in a session between the Source and Destination shown in FIG. 4. These packets can be bidirectional; namely, the packets can be directed from the Source to the Destination (e.g., requesting data, such as a video stream), or from the Destination to the Source (e.g., a video stream in response to the noted video stream request). To that end, FIG. 6 schematically shows four primary parts of a packet 600 configured in accordance with illustrative embodiments of the invention.

This illustrative packet 600 preferably has at least four primary portions. Specifically, the packet 600 has the two previously noted portions; namely, the header 602, known as an "IP header 602," having the address of the network device to receive the packet 600 (e.g., the Destination), the identity of the network device that sent the packet 600 (e.g., the Source), and other data for routing the packet 600. The packet 600 also has a payload 604 with the information being conveyed (e.g., text, graphic, audio, or video data).

In accordance with illustrative embodiments, the packet 600 further includes metadata 606, which includes information relating to one or both of 1) the session itself and 2) the payload data 604. It is expected that this metadata 606 commonly will comprise one time data that only needs to be sent in a first packet, or within one of the first packets, of the session. For example, the metadata 606 can include information about the bandwidth allocated to user/Source, the user profile, a return address, policy information, access control, and encryption algorithms for the session. In addition or more specifically, the metadata 606 also can include, among other things:

Original Source IP address and port,
    Suggested security parameters for the session (including authorization level, network segment allowed to access, services allowed to access, etc.).
    Traffic engineering parameters (including minimum and maximum bandwidth, Quality of Service Parameters (QOS), minimum and maximum allowed packet rate, etc.),
    Precedence level,
    Information about whether subsequent packets will be authenticated, and
    Information about whether subsequent packets will be encrypted, As an example, the Source may include a consumer on their personal computer, while the Destination may include a video server for transmitting video on-demand content to the consumer. Among other things, the metadata 606 may include information relating to the level of service the consumer has paid for, as well as the selection of movies available for this particular consumer based upon their membership status with the company delivering the video services. Indeed, this type of information is expected to be transmitted in the first or one of the first packets and thus, is not required to be transmitted after it is received by the Destination.

Finally, the packet 600 also includes a digital signature 608 to authenticate its data—preferably, to authenticate the payload and/or the metadata. As discussed in greater detail below with regard to FIGS. 7, the digital signature 608 preferably is formed using a private authentication key to apply to at least the encrypted or unencrypted payload 604 and metadata 606. If the (encrypted or unencrypted) payload 604 or metadata 606 are changed in any point in the session before the packet 600 is received by the ultimate destination, then the signature 608 will be invalid. Accordingly, the signature 608 plays an important role in ensuring the validity of the data for the session.

Figure 7:
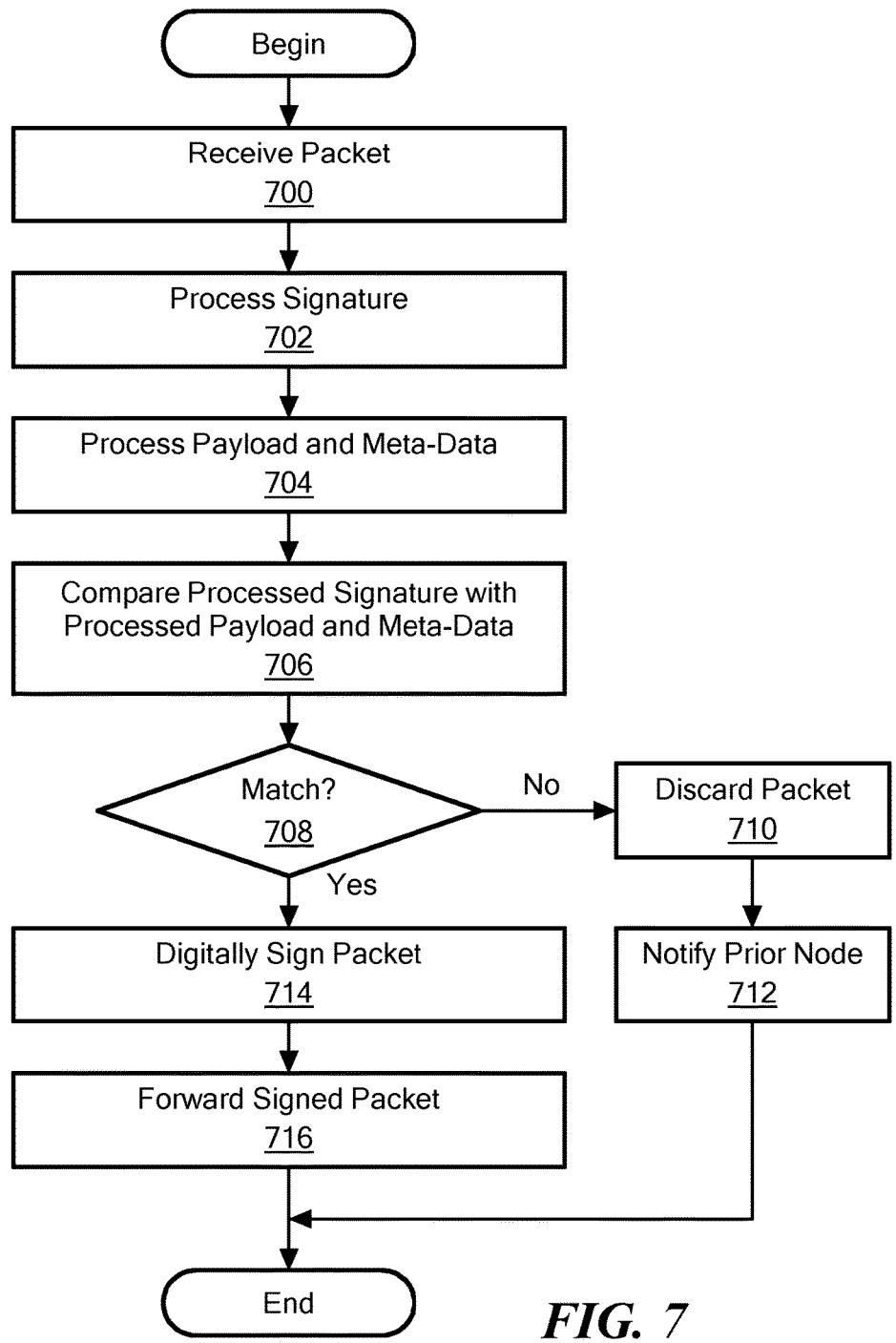
FIG. 7 shows a method of securely routing packets in accordance with illustrative embodiments of the invention.

FIG. 7 shows a process used by the node 400 of FIG. 5 for processing one or more session packets in accordance with illustrative embodiments of the invention. This node 400 may be alternatively referred as the "current node 400." It should be noted that this process is substantially simplified from a longer process that normally would be used to process the packet 600. Accordingly, the process may have many other steps that those skilled in the art likely would use. In addition, some of the steps may be performed in a different order than that shown, or at the same time. Those skilled in the art therefore can modify the process as appropriate.

Before beginning the process, however, the current node 400 obtains a copy of the secret authentication key of other relevant nodes 400 in the network. In illustrative embodiments, the node 400 obtains copies of the secret authentication keys of most or all of the nodes 400 in the network—mainly the next-hop nodes 400. To that end, at startup/boot-up and preferably periodically after startup, the key manager 508 of the node 400 requests the noted authentication keys from the key network device 404 across the network. After verifying the identity of the node 400, the key network device 404 forwards the requested keys to the node 400. The key manager 508 therefore receives the keys at the I/O interface 500, and stores them in the storage device 510 for the node 400. In alternative embodiments, the node 400 obtains the relevant secret key while executing the process of FIG. 7.

Any of a variety of different secret authentication keys may be used. For example, some embodiments may simply use symmetric secret authentication keys. Other embodiments may use public-private authentication key pairs. Discussion of a specific type of authentication key thus is not intended to limit all embodiments of the invention.

After the current node 400 has the relevant keys, the process begins at step 700, which receives the first packet 600 in a session through the I/O interface 500 of the current node 400. As noted above, the first packet 600 in the session preferably has the format as shown in FIG. 6. When executing the TCP protocol, for example, the first packet 600 may simply be the well-known SYN packet sent from the Source. In that case, the payload 604 at least includes the payload data typically included in a conventional SYN packet. It should be noted that this process may be applied to the well-known SYN-ACK packet, which is sent from the Destination back toward the Source when using the TCP protocol. Accordingly, this process applies to double authentication technologies.

Embodiments not using the TCP protocol may have other types of packets as the first packet 600. For example, if implementing the user datagram protocol (a/k/a the "UDP Protocol"), the first packet 600 may have payload information typically sent in later packets of the TCP protocol. Continuing with the earlier example, such a payload 604 may include video data.

For discussion purposes, the payload 604 and meta-data 606 of the received first packet 600 may be encrypted using some encryption key known to the receiving router 400. Of course, discussion of such an encrypted packet 600 should not limit various other embodiments that do not encrypt the relevant data. Some embodiments may not apply to packets 600 with encrypted data.

After receiving the packet 600, the signature module 506 begins the validation process. To that end, the signature module 506 processes the digital signature 608 to produce a processed digital signature that later will be used to compare against other relevant packet data (step 702). Specifically, using the secret authentication key, the signature module 506 processes the digital signature 608 to produce the processed digital signature. If the packet 600 has not been tampered with prior to this step, this processed digital signature has a direct relationship to the payload 604 and the meta-data 606 in the packet 600 (discussed below with regard to step 708).

In this example, the signature module 506 retrieves its own secret authentication key from the storage device 510. For faster retrieval, however, alternative embodiments retrieve the secret authentication key from local high-speed memory, such as a local cache.

Rather than use the secret authentication key of the node 400 for processing the digital signature 608, some embodiments use another secret authentication key, such as the authentication key of the prior node 400 that generated the signature 608. Moreover, in other embodiments, before forming the digital signature 608, the prior node 400 may have processed the data from its original format. For example, the prior node 400 may have executed a one-way hash function against the data being encrypted into a digital signature 608. If that is the case, the signature module 506 may 1) further process the resulting data further to obtain the original data (i.e., the payload 604 and the meta-data 606), or 2) simply stop processing the signature 608 so that the processed digital signature will include the hash of the payload 604 plus the meta-data 606. Illustrative embodiments take the latter approach (i.e., option 2).

In illustrative embodiments, such a prior node 400 is not necessarily the immediate prior-hop network device. Instead, the prior node 400 may be separated from the receiving node 400 by network devices or other networks, whichever the case may be. Using FIG. 4 as an example, the node 400 identified as "Node 2" may be the node 400 executing the process of FIG. 7. Accordingly, the packet 600 being processed may have been encrypted by Node 1 and forwarded to Node 2 through the intervening smaller network 402, which could have hundreds, thousands or even millions of network devices.

As a second example, Node 4 may be the node 400 executing the process of FIG. 7. In that case, the packet 600 being processed may have been encrypted by Node 3, which is the immediate prior hop network node 400. In yet other embodiments using the second example, a plurality of intervening nodes 400 configured to execute the process of FIG. 7 may have skipped their processing. In that example, only one of Node 1 or Node 2 could have encrypted the packet 600 that is intended for Node 4 to process.

To ensure confidentiality of the data it carries, some embodiments encrypt the payload 604 and metadata 606 using an encryption key (e.g., the encryption key of either of the current node 400 or the prior node 400). Other embodiments do not encrypt the payload 604 and meta-data 606. Illustrative embodiments, however, may encrypt and thus, this process will continue assuming that those data are encrypted.

The process continues to step 704, which processes the payload 604 and the meta-data 606 into a form that can be used to validate the digital signature 608. To that end, the encryption engine 504 uses the appropriate encryption key to decrypt the payload 604 and metadata 606 of the packet 600. In a manner similar to the authentication keys used for the digital signature 608, some embodiments may use the node's own digital encryption key, or the encryption key of another node 400, such as the prior node 400 that encrypted the data.

Next, the signature module 506 further processes the payload 604 and meta-data 606 using a known one-way hash function to produce validation information. In alternative embodiments, the signature module 506 may skip this hashing process.

The signature module 506 (or other functional component, such as a microprocessor on the node 400) now compares the two data sets—the processed digital signature and the validation information at step 706 to determine if they are a match (step 708). In illustrative embodiments, the two data sets are considered to be a match only if they are exactly identical. For example, in the embodiment that hashes the payload 604 and the meta-data 606, the processed digital signature is a hash value that is the same as the hash of the payload 604 and the meta-data 606 using the prior noted one-way hash function.

If not a match, then the signature module 506 discards the packet 600 (step 710) and notifies the prior node 400 of an error condition (step 712). Specifically, if there is not a match, then someone or a device between the prior node 400 and this current node 400 may have tampered with the payload 604 and/or the metadata 606. In other words, the "man-in-the-middle" may have tampered with the packet 600. Receipt of the error condition notification preferably causes a message to be forwarded back to the originating device, such as the Source. The Source may respond in any of a number of manners, such as by not attempting to reestablish the session, or making another attempt to reestablish the session.

Conversely, if step 708 determines that there is a match between the compared data, then the signature module 506 digitally signs the packet 600 (step 714). To that end, the signature module 506 may retrieve the secret digital authentication key of the next node 400, hash the payload 604 and meta-data 606 to produce a hash value (e.g., using the noted one-way hash function), and then process the hash value to digitally sign the packet 600. As noted above, some embodiments may not further process the payload 604 and/or metadata 606 before forming the signature 608. In addition, for confidentiality purposes, the encryption engine 504 also may encrypt the payload 604 and/or metadata 606 using an encryption key.

Some embodiments may use the authentication key to sign the packet 600 using the IP header 602 and the encrypted hash of the payload 604 and metadata 606. The below pseudo code may implement such a step:

SignUsingAuthenticationKey(IPHeader+encrypted(Hash (pay load plus metadata)))

Rather than using the secret digital authentication key of the next node 400, some embodiments may use the secret digital authentication key of another node 400, such as the node 400 processing the packet 600. Those skilled in the art can select the appropriate key based upon the specifications of their particular application.

Accordingly, various embodiments use hashes, the raw payload 604 and meta-data 606, and/or other techniques to validate the digital signature 608. In fact, some embodiments may process or not process the digital signature 608 to produce some comparator data to compare against the validation information. Those skilled in the art can select the appropriate technique for their specific application. Various embodiments therefore are not necessarily limited to specific ways of processing the digital signature 608, the payload data 604, and the meta-data 606.

Finally, after signing the packet 600, the routing module 502 forwards the signed packet 600 to the next node 400 through the I/O interface 500 (step 716). This packet 600 continues to traverse along the network until it is received by another node 400 that is specially configured to execute the process of FIG. 7.

As known by those in the art, a session typically includes a first session packet, a plurality of intermediate session packets, and a last session packet. Illustrative embodiments of the invention execute this process of FIG. 7 on the first packet 600 only. This should reduce overhead costs when compared to nodes 400 processing intermediate packets in a similar manner. Despite this, some embodiments may repeat the process of FIG. 7 for the second packet of the session, the third packet of the session, or any prescribed number of additional packets in the session (even the last packet). Accordingly, discussion of use with the first packet 600 only is for illustrative purposes only, and is not intended to limit all embodiments. Still other embodiments may skip the process for the first packet 600. Instead, in that case, those embodiments may execute the process in a later packet, such as the second or third packet.

This processed packet 600 continues past the next node 400 and ultimately arrives at the Destination. In some embodiments, one of the nodes 400, such as the node 400 logically positioned just before the Destination, removes the digital signature 608 before forwarding it to the Destination. Other embodiments, however, may remove the digital signature 608 at the Destination. Still other embodiments permit the Destination to receive the packet 600 with the digital signature 608 intact.

Again, it should be noted that various embodiments repeat this process for other session packets 600 traversing between the Destination to the Source. In addition, illustrative embodiments implement this process on way-points or nodes 400 executing the stateful processes of the above incorporated patent applications.

Accordingly, unlike prior art routing devices known to the inventors, illustrative embodiments digitally sign at least one session packet using payload 604 and metadata 606 information to ensure greater security in Layer 3 (Network Layer) transmissions between two network devices. Such processes should eliminate the need to use Layer 7 (Application Layer) authentication processes (e.g., implemented within firewalls), which undesirably can expose a network device to attack.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as a pre-configured, stand-along hardware element and/or as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Although the above discussion discloses various exemplary embodiments of the invention, it should be apparent that those skilled in the art can make various modifications that will achieve some of the advantages of the invention without departing from the true scope of the invention.

What is claimed is:

1. A network routing device for processing a session of an IP network having a plurality of nodes, the plurality of nodes including a next node having a next authentication key, the network routing device having a current authentication key distinct from the next authentication key and comprising:
   an input interface at least partially implemented by an electronic circuit and configured to receive a first session packet, the first session packet having a digital signature, payload data, and meta-data;
   a signature module at least partially implemented by an electronic circuit and operatively coupled with the input interface, the signature module being configured to process the digital signature using the current authentication key to produce a processed digital signature,
   the signature module also being configured to process the payload data and the meta-data to produce validation information,
   the signature module further being configured to compare the processed digital signature and the validation information to determine if they match, the signature module further being configured to 1) discard the first session packet when there is not a match, and 2) digitally sign the first session packet using the next authentication key when there is a match; and
   an output interface at least partially implemented by an electronic circuit and operatively coupled with the signature module, the output interface being configured to route the first session packet, after digitally signing, to the next node via the IP network using a Layer 3 protocol.

2. The network routing device as defined by claim 1 wherein the signature module is configured to apply a hash function to the payload data and meta-data to produce the validation information.

3. The network routing device as defined by claim 1 wherein the session comprises the first session packet, a plurality of intermediate session packets, and a last session packet, the signature module being configured to digitally sign the first session packet only, the intermediate session packets being forwarded after receipt without a digital signature.

4. The network routing device as defined by claim 1 wherein the meta-data includes data relating to 1) the session, 2) the payload data, or 3) both the session and payload data.

5. The network routing device as defined by claim 1 further comprising:
   a key manager operatively coupled with the signature module, the key manager being configured to retrieve the next authentication key from a key network device across the network, the key network device having a copy of authentication keys for a set of the plurality of nodes.

6. A method of processing a session having a first session packet received by a current node in an IP network having a plurality of nodes, the plurality of nodes including a next node, the current node configured to communicate with the next node using a Layer 3 protocol, the method comprising:
   receiving the first session packet at the current node, the first session packet having a digital signature, payload data, and meta-data;
   processing the payload data and the meta-data to produce validation information;
   processing the digital signature using a given authentication key to produce a processed digital signature;
   comparing the validation information with the processed digital signature;
   discarding the first session packet if the validation information does not match the processed digital signature;
   digitally signing the first session packet with a next authentication key of the next node if the validation information matches the processed digital signature, the next authentication key being distinct from the given authentication key; and
   routing the first session packet, after digitally signing, to the next node via the IP network.

7. The method as defined by claim 6 wherein the current node has the given authentication key.

8. The method as defined by claim 7 wherein the next node has a next authentication key, digitally signing the first session packet comprising digitally signing the first session packet using the next authentication key, the payload and the meta-data.

9. The method as defined by claim 6 wherein the current node comprises a router device.

10. The method as defined by claim 6 wherein the session comprises the first session packet, a plurality of intermediate session packets, and a last session packet, the method digitally signing and forwarding the first session packet only.

11. The method as defined by claim 6 wherein the validation information matches the processed digital signature when the validation information is substantially exactly the same as the processed digital signature.

12. The method as defined by claim 6 wherein the given authentication key comprises a public-private key pair, or a symmetric key.

13. The method as defined by claim 6 wherein the network includes a public network having a source node and a destination node, the first session packet being received from the source node via a set of nodes, the first session packet having the destination node address as the ultimate destination of the first session packet.

14. The method as defined by claim 6 wherein processing the payload and meta-data comprises processing the payload and meta-data using a one-way hash function.

15. The method as defined by claim 6 further comprising:
receiving a second session packet at the current node, the second session packet having a second digital signature, second payload data, and second meta-data;
processing the second payload data and the second meta-data to produce second validation information;
processing the second digital signature using the given authentication key to produce a second processed digital signature;
comparing the second validation information with the second processed digital signature;
discarding the second session packet if the second validation information does not match the second processed digital signature;
digitally signing the second session packet if the second validation information matches the second processed digital signature; and
routing the second session packet, after digitally signing, to the next node via the IP network.

16. The method as defined by claim 6 wherein the meta-data includes data relating to 1) the session, 2) the payload data, or 3) both the session and payload data.

17. The method as defined by claim 6 wherein the first session packet comprises a SYN packet of the TCP protocol.

18. The method as defined by claim 6 further comprising:
starting up the current node; and
retrieving a next authentication key, for the next node, from a key network device across the network, the key network device having a copy of the authentication keys for a set of the plurality of nodes.

19. The method as defined by claim 6 wherein:
the given authentication key is the authentication key for the current node; and
the next node has a next authentication key, the method digitally signing the first packet using the next authentication key if the authentication data matches both the payload data and meta-data.

20. A computer program product for use on a computer system for processing a session having a first session packet received by a current node in an IP network having a plurality of nodes, the plurality of nodes including a next node, the current node configured to communicate with the next node using a Layer 3 protocol, the computer program product comprising a tangible, non-transitory computer usable medium having computer readable program code stored thereon, the computer readable program code, when executed by a processor, performing the steps of:

receiving the first session packet at the current node, the first session packet having a digital signature, payload data, and meta-data;
processing the payload data and the meta-data to produce validation information;
processing the digital signature using a given authentication key to produce a processed digital signature;
comparing the validation information with the processed digital signature;
discarding the first session packet if the validation information does not match the processed digital signature;
digitally signing the first session packet with a next authentication key of the next node if the validation information matches the processed digital signature, the next authentication key being distinct from the given authentication key; and
routing the first session packet, after digitally signing, to the next node via the IP network.

21. The computer program product as defined by claim 20 wherein the session comprises the first session packet, a plurality of intermediate session packets, and a last session packet, the program code being configured to digitally sign and forward the first session packet only.

22. The computer program product as defined by claim 20 wherein the current node has the given authentication key.

23. The computer program product as defined by claim 22 wherein the next node has a next authentication key, the program code for digitally signing the first session packet comprising program code for digitally signing the first session packet using the next authentication key, the payload and the meta-data.

24. The computer program product as defined by claim 20 wherein the validation information matches the processed digital signature when the validation information is substantially exactly the same as the processed digital signature.

25. The computer program product as defined by claim 20 wherein the current authentication key comprises a public-private key pair, or a symmetric key.

26. The computer program product as defined by claim 20 wherein the meta-data includes data relating to 1) the session, 2) the payload data, or 3) both the session and payload data.

27. A method of processing a session having a first session packet received by a current node in an IP network having a plurality of nodes, the plurality of nodes including a next node, the current node configured to communicate with the next node using a Layer 3 protocol, the method comprising:
receiving the first session packet at the current node, the first session packet having a digital signature, payload data, and meta-data;
using the payload data and the meta-data to produce validation information;
using the digital signature to produce a comparator digital signature;
comparing the validation information with the comparator digital signature;
discarding the first session packet if the validation information does not match the comparator digital signature;
digitally signing the first session packet with a next authentication key of the next node if the validation information matches the comparator digital signature, the next authentication key being distinct from the given authentication key; and
routing the first session packet, after digitally signing, to the next node via the IP network.

28. The method as defined by claim 27 wherein using the payload data and the meta-data comprises using a hash function to produce the validation information.

29. The method as defined by claim 27 wherein the current node has a given key, the method using the given key to produce the comparator digital signature.

30. The method as defined by claim 27 wherein the validation information comprises the raw payload data and meta-data.

31. The method as defined by claim 27 wherein the next node has an associated next authentication key, digitally signing comprising using the next authentication key to digitally sign the first session packet.

* * * * *